Oct. 22, 1968     R. I. JENKINSON     3,406,945
LAMINATED JOINT
Filed Oct. 6, 1965
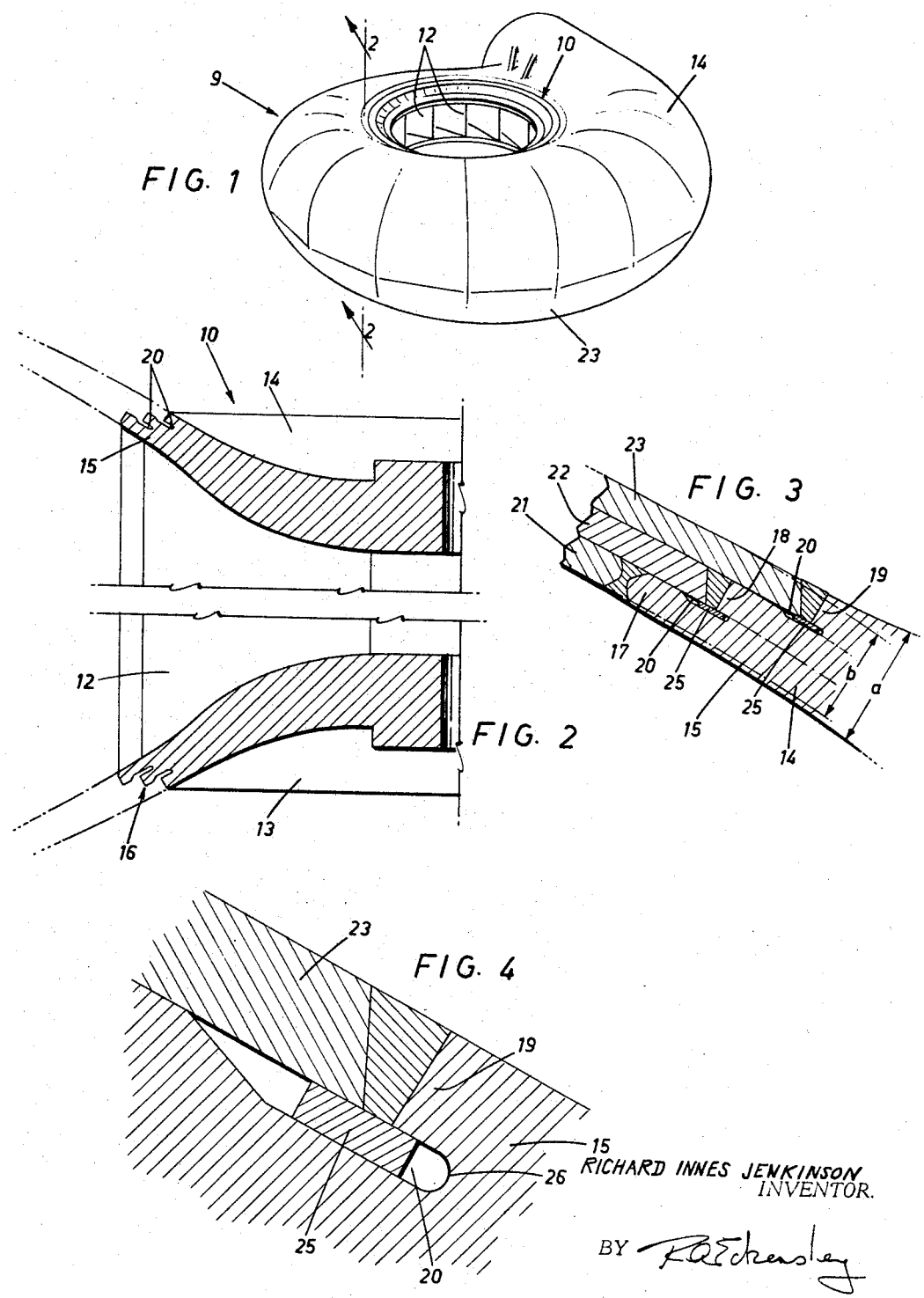
RICHARD INNES JENKINSON
INVENTOR.
BY

United States Patent Office 3,406,945
Patented Oct. 22, 1968

3,406,945
LAMINATED JOINT
Richard Innes Jenkinson, Lachine, Quebec, Canada, assignor to Dominion Engineering Works, Limited, Lachine, Quebec, Canada, a corporation of Canada
Filed Oct. 6, 1965, Ser. No. 493,521
8 Claims. (Cl. 253—120)

ABSTRACT OF THE DISCLOSURE

A scroll casing is fabricated from two or more layers of overlying plates, welded to the edge of the casing shroud members by staggered butt welds, the edges of each shroud member being divided by separating grooves into suitable strips or lands approximating in width to the plate thickness of the plates being butt welded to the lands.

---

This invention is directed to a method of fabricating a thick walled pressure vessel, and to a pressure vessel, fabricated in accordance with the invention. In particular it is directed to a construction of a scroll casing of laminated form for use in a water turbine.

Previously constructed scroll casings have generally been fabricated of single plate thickness, and have involved bending and forming very thick plates before weldment to the shrouds of a stay ring. Fabrication of a scroll casing according to the previous method suffers from the disadvantages that the use of a plate of single thickness is very inefficient in terms of stress distribution, there being a variation in bending stresses across the thickness of the plate, while weldment of the plate to the shrouds of the stay ring is very complex, due to the extreme thickness of the butting edges, and in addition the resulting product is characterized by high stress concentrations which often lead to formation of stress cracks in the materials.

While multi-thickness laminated structures such as boilers are known, wherein the cylindrically curved wall comprises a plurality of superimposed plate layers, previous practice has been to butt-weld the individual plate layers to the single thickness end of the vessel by way of a series of adjoining butt welds. This produces a weldment area of very high stress intensity, requiring extensive heat treatment to reduce stress concentrations, in order to reduce the likelihood of crack propagation and material failure due to overstress.

An object of present invention is to provide a pressure vessel having a plurality of laminations for a portion of its structure, joined to an additional thick member by way of a series of separated weld zones.

The present invention further provides a method of joining a plurality of plates in superposed relationship to a member having a thick edge whereby concentration of stress in the thick member is avoided.

A further object of the present invention is the provision of a water turbine scroll casing of laminated form having an improved welded joint structure and a method for manufacturing the same.

What is provided is a method of welding a plurality of superposed plates in a butting relation with the edge of a member having a longitudinally extending thick edge, comprising the steps of dividing the extended thick edge into a plurality of longitudinally extending substantially parallel lands by way of a recess extending longitudinally between each of the lands and defining a stress relief zone therebetween, and successively positioning and welding each of the plates in a butting relation with a respective land, including the step of inserting a backing member within at least one of the recesses in backing relation with the weld zone of the respective plate, whereby full penetration of the weld may be effected and additional weld penetration is limited by the backing member.

It has been found that the provision of a plurality of longitudinally extending parallel lands separated one from the other by a radiused groove, wherein the groove defines a narrowed section of the land provides a structure adapted to distribute stresses more uniformly through the thick walled member, while the radius at the root of the groove reduces the likelihood of the propagation of crack failure and at the same time increases the capacity for strain energy of the thick walled member whereby the structural efficiency of the assembly is improved.

Thus the present invention provides an annular stay ring for incorporation by welding into the scroll casing of a water turbine, including at least one annular shroud member having an outer edge adapted for welding to a plurality of superposed plates of the casing, the outer edge having a transverse thickness exceeding the aggregate thickness of the superposed plates, annular grooves extending around the ring edge and dividing the surface thereof into a plurality of stepped lands, each land having an outer surface at a radius from the main axis of the shroud member differing from that of the outer surface of the other lands, whereby on assembly of the shroud member by welding the lands in butting relation with the corresponding plates, a series of axially and radially spaced weld zones is created.

The following is a description by way of example of certain embodiments of the present invention, reference being had to the accompanying drawings, in which:

FIGURE 1 shows a general view of a typical stay ring and spiral case assembly in which the present invention is utilized;

FIGURE 2 is a section view along line 2—2 of FIG. 1 showing three superposed plates in welded relation with the stay ring of FIGURE 1;

FIGURE 3 is an enlarged view of a portion of FIGURE 2; and

FIGURE 4 shows one of the welded joints in detail.

Referring to FIGURES 1 and 2 the scroll casing 9 comprises a stay ring 10 surrounded by a scroll of multiple thickness welded plates. The water turbine stay ring 10 comprises a bottom annular shroud 13, a top annular shroud 14 and a series of stay vanes 12 fastened therebetween.

With reference to FIGS. 2, 3 and 4, it will be seen that the thick outer edges 15, 16 of the top and bottom shroud rings 14, 13 are divided into a plurality of staggered lands 17, 18 and 19 by means of grooves 20, adapted to receive backing strips 25 therein. The backing strips 25 may be of copper or other suitable material, and are inserted within the recesses in order to permit full weld penetration, as illustrated in FIGURES 2 and 3.

The root portions 26 of the grooves 20 are shown as being radiussed in order to prevent the concentration of stresses within the groove.

It will be seen from FIGURE 3 that the transverse dimension $a$ may exceed the aggregate plate thickness $b$ of the superposed plates 21, 22, 23, while at the same time presenting a zone of graduated stress transition.

A structure according to the present invention is of particular value in enabling a prefabricated pressure vessel such as a water turbine spiral or scroll casing to be conveyed to a remote site in its component parts and assembled at the site by welding, the need for heat treatment of the vessel subsequent to welding being reduced or obviated.

Owing to the improved material efficiency made possible by the present invention, the average stress level in at least some of the components comprising the pressure vessel can be raised substantially, so that the total mass of the vessel is correspondingly reduced, thereby reducing material, fabrication and shipping costs.

What I claim as new and desire to secure by Letters Patent of the United States is:

1. A body having at least one member of thick cross-section having an extended edge of the member adapted for connection by welding in abutting relation with a plurality of superposed plates, the extended thick edge of said member having a plurality of recesses extending therealong to form a plurality of edge lands along said edge for individual welded connection in abutting relation with respective ones of said plates.

2. A body as claimed in claim 1, wherein said recesses are adapted to receive a longitudinally extending weld backing strip on assembly with said plates.

3. A body as claimed in claim 1, wherein said lands are in staggered arrangement, whereby adjacent weld joints are in non-overlapping relation.

4. A body as claimed in claim 1, in which said composite body comprises a stay-ring adapted for incorporation by welding into a scroll casing for a water turbine, said member of thick cross-section being an annular shroud ring forming part of said stay-ring.

5. A body having at least one extended edge portion of thick cross-section divided by longitudinally extending recesses into a series of stepped lands, at least one said recess having an upper surface constituting a portion of the lower face of the adjacent upper land, and a lower surface defining a portion of the upper surface of the adjacent lower land, one said surface having a sloped transition portion adjoining the respective land, whereby said stepped lands may be connected by welding in respective abutting relation with individual ones of a stack of plates.

6. A composite welded structure comprising a pressure vessel having a first wall portion formed of a plurality of superposed plate layers terminating in a second wall portion having a thickness exceeding the aggregate thickness of said plate layers, each said plate being welded in abutting relation with a part of said second portion constituting a land, each said land being separated from adjoining lands in the region of the weld by a groove extending substantially parallel with the weld, and a backing strip inserted within each said groove in backing relation with a said weld whereby root penetration of the weld between a said plate and its respective land is contained by said backing strip.

7. A composite welded structure as claimed in claim 6 wherein the end of each said plate and the corresponding abutting land face are in staggered relation with adjacent plate ends to provide non-coincident weld zones.

8. An annular stay-ring for incorporation by welding into the scroll casing of a water turbine, including at least one annular shroud member having an outer edge adapted for welding to a plurality of superposed plates of said casing, said outer edge having a transverse thickness exceeding the aggregate thickness of said superposed plates, annular grooves extending around said ring and dividing the surface thereof into a plurality of stepped lands, each said land having an outer surface at a radius from the main axis of said shroud member differing from that of the other said lands, whereby on assembly of said shroud member by welding said lands in butting relation with respective ones of said plates a series of axially and radially spaced welded zones is created.

References Cited
UNITED STATES PATENTS

| | | | |
|---|---|---|---|
| 3,204,931 | 9/1965 | Edvardsen | 253—26 |
| 1,380,065 | 5/1921 | Hutchinson et al. | 253—120 |
| 2,994,348 | 8/1961 | Cape | 138—172 |
| 3,180,021 | 4/1965 | Cordea et al. | 29—483 |

FOREIGN PATENTS 254,464    7/1926    Great Britain.

EVERETTE A. POWELL, JR., *Primary Examiner.*